April 11, 1961    J. S. CHRISTIE    2,978,951
METHOD AND SYSTEM OF COLOR MONITORING
Filed Feb. 13, 1958    4 Sheets-Sheet 3

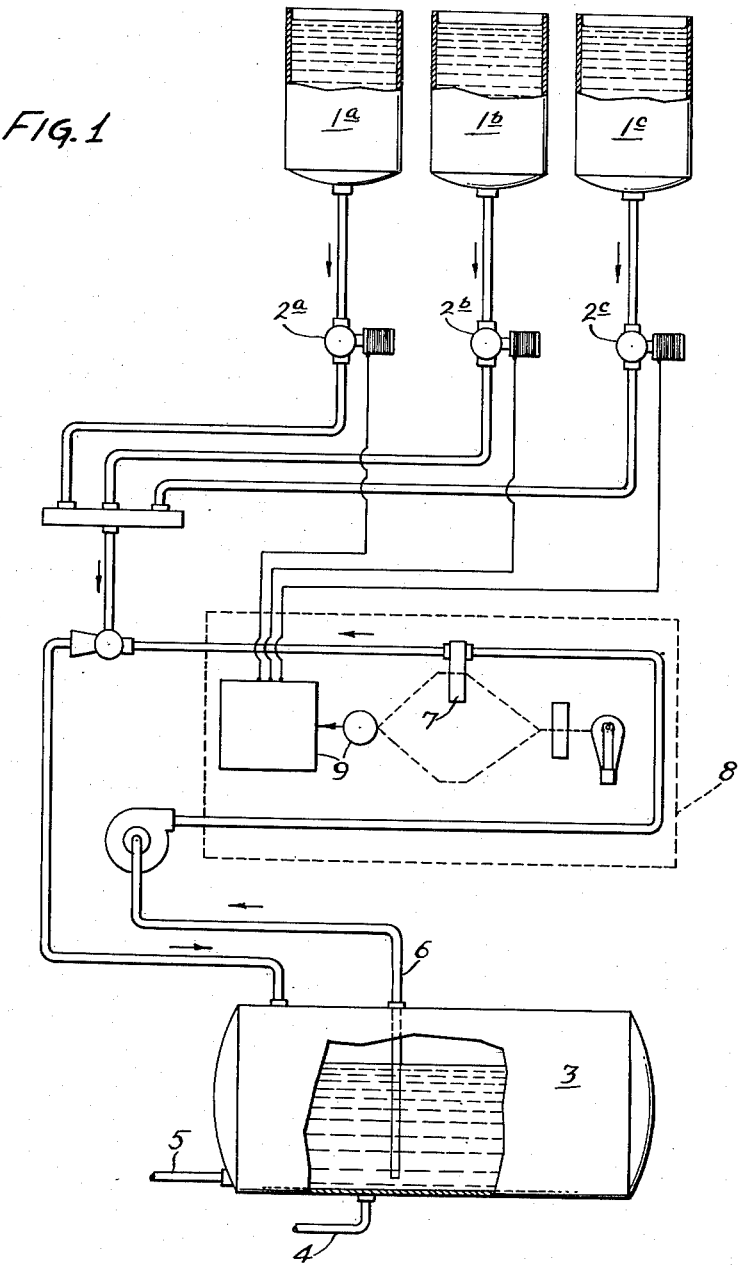

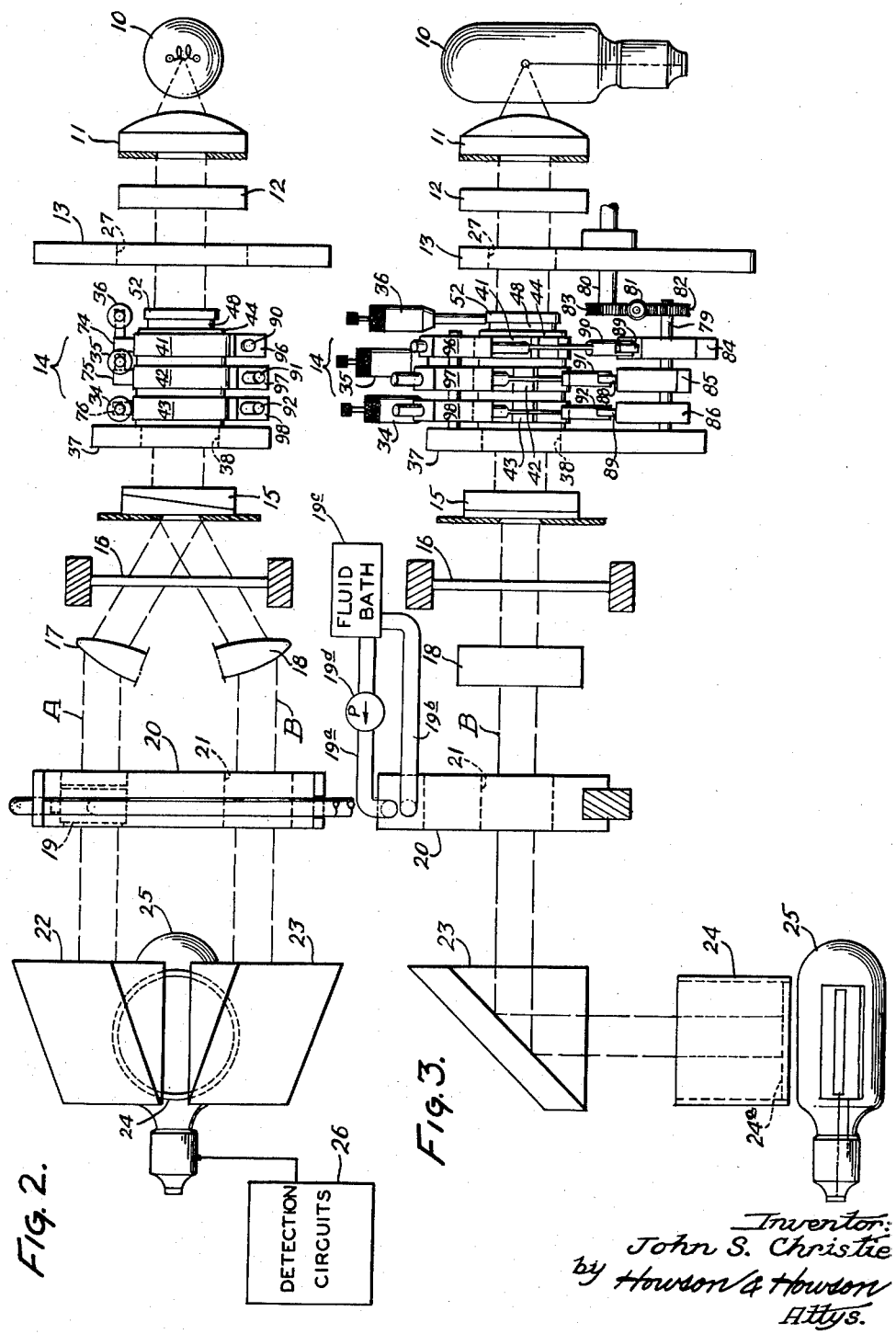

Inventor:
John S. Christie
by Howson & Howson
Attys.

April 11, 1961  J. S. CHRISTIE  2,978,951
METHOD AND SYSTEM OF COLOR MONITORING
Filed Feb. 13, 1958  4 Sheets-Sheet 4

Inventor
John S. Christie
by Howson & Howson
Attys.

United States Patent Office 2,978,951
Patented Apr. 11, 1961

2,978,951
METHOD AND SYSTEM OF COLOR MONITORING

John S. Christie, Oreland, Pa., assignor to The Proctor-Silex Corporation, a corporation of Connecticut Filed Feb. 13, 1958, Ser. No. 714,988

8 Claims. (Cl. 88—14)

This invention relates to a method of monitoring the color of a transparent fluid which is colored by a combination of two or more color constituents. This invention also relates to the system for monitoring the color of such a fluid, which system may be provided with a novel light transmissive color standard.

Fluid colors are frequently unstable or are subject to deterioration by depletion of one or more of the constituents, yet in many instances it is desirable to maintain the color of a fluid to a high degree of accuracy. A particular instance is the case of dyes used to dye fabrics. Such dyes are ordinarily a mixture of two or more constituent dyes which are blended in certain ratios and amounts to form the desired color. As fabric is dyed certain ones of the constituent dyes may be depleted more rapidly than others; also effects such a deterioration under light and other effects may cause fading of the dye solution as a whole or of one or more of the constituents so that gradually the color of the dye changes.

In a certain area of the fabric dyeing art goods are dyed under conditions requiring constant temperature, time of exposure to dye, flow rate of dye solution, and concentration of dye stuffs. Although the first three variables are easily controllable by standard instrumentation, heretofore there has been no method of, or system for, effectively controlling dye concentration to obtain a desired uniform effect. For such applications a satisfactory means of keeping dye concentrations has long been sought, but no satisfactory system for doing this has been devised.

The present invention relates to a method of monitoring the color of continually flowing fluids which produces essentially constant results which are not subject to human error by visual judgment. The invention also concerns a method which can employ known color comparison systems.

Broadly speaking, the method comprises selecting a standard to simulate the desired color and selecting a sample of predetermined size from the bath for comparison with the standard. The fluid sample from the bath is constantly replaced in order to accomplish monitoring. A light beam is passed through the standard and then split into two beams having different intensities, one of the two beams passes through the sample. The two beams split from the one are continuously compared after passing through the sample to detect any deviation from the predetermined relative light intensities of these beams which obtains when the sample matches the color represented by the standard.

The standard is preferably adjusted so that the intensities of the two light beams are equal. In most cases where the color is a mixture of constituent colors from the visible range, the light beams are sequentially filtered to produce different colors so that the standard and the sample can be simultaneously compared in each of several selected frequency bands of light. While the monitoring or detecting of deviations from the standard may be sufficient in itself to permit manual adjustment for correction, for example, the present invention also contemplates that when deviations are detected a signal may be produced by apparatus sensitive to deviations which will actuate a solenoid operated valve or otherwise effectively provide for the addition of color constituents to the fluid mixture.

The method is ordinarily practiced in conjunction with a novel monitoring system in which along a beam path means is provided for splitting a beam into two beams. A standard representing the color to be matched by the fluid is arranged in the original beam path, and a sample holder is arranged in one of the two split beam paths. A flow path is provided between the bath and the sample holder permitting constant change of the sample, and means is provided for producing continuous flow from the bath to the sample holder. After the beam passes through the sample, means is provided for comparing the intensities of the two beams to determine deviation of the two beams from their predetermined relative light intensities which obtain when the sample matches the color represented by the standard. Additional apparatus may be provided for accomplishing the additional method steps necessary in the practice of the present invention.

In accordance with this invention, the so-called "color standard" is not of a particular color but is preferably of a light intensity regulating system including polarizing members which are used in conjunction with colored filters which limit the band width of frequencies transmitted. By adjusting one polarizing member relative to another the light transmission in the original light beam is effectively made to simulate the light transmission through a color standard for each of the filter colors employed. Of course, under conditions of monochromatic light, no filtering would be required and only the intensity regulating means would be necessary, but this is an isolated and unusual condition from a practical standpoint. For use in more usual circumstances is a preferred type of standard which in accordance with the present invention regulates the light intensity by light polarization by means hereafter described and claimed. The beam splitting technique employed also permits the maximum intensity of the two beams to differ so that the polarizing medium may reduce the intensity of the uninterrupted split beam and establish relative intensities in the beams such that the intensity of the beam which is to pass to the sample is reduced by its filtering effect to the same intensity as the other split beam.

The invention may be clearly understood from the following detailed description with reference to the accompanying drawings, in which:

Fig. 1 is a schematic diagram showing the monitoring system of the present invention;

Fig. 2 is a generally diagrammatic plan view of a color comparison portion of the monitoring system of the present invention;

Fig. 3 is a similar elevational view of the color comparison portion of the system;

Figure 4:
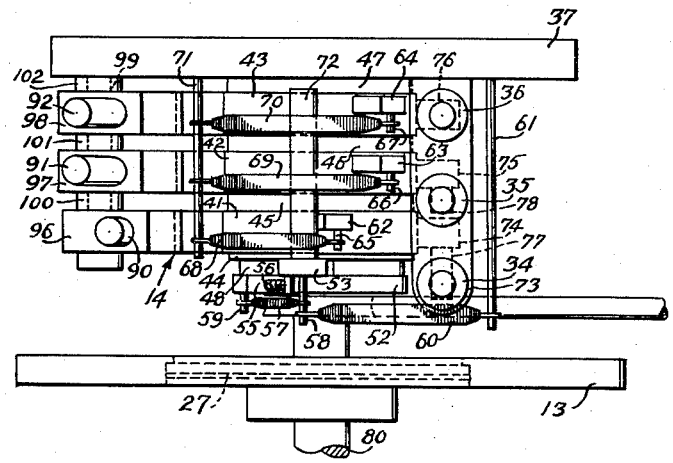
Fig. 4 is a plan view of the preferred mechanism provided by this invention to effect equalization of transmission of the light beams as above-mentioned.

Referring first to Fig. 1, a system embodying the present invention is shown schematically. This system employs a transparent fluid whose color is controlled by a monitoring device which not only detects deviation in color of a fluid bath but also corrects the color of that bath back to the standard color. Correction is accomplished by adding fluids of constituent colors from the individual tanks 1a, 1b and 1c, and these are added through valves 2a, 2b or 2c which may be actuated by solenoids or other flow control means. The fluids are fed into a manifold and on into a tank 3 wherein mixing is completed. The mixed fluid may, for example, be dye fed through line 4 to a dyeing chamber, and the partially exhausted dye may be returned to the tank through line 5. Other fluids, of course, can be used in place of dyes. Samples of fluid thoroughly mixed by means not shown are withdrawn from tank 3 through line 6 to pass through a sample cell 7 of predetermined size and arrangement. The sample cell is in a color-comparison device 8 which will be described hereafter in greater detail and which constitutes the heart of the present invention. Deviations of the fluid color from the standard are detected by detection and signal producing means 9 which, in turn, is coupled to the valve means 2a, 2b and 2c controlling flow of colored fluid constituents so that upon detection of error the appropriate valves can be actuated in order to add fluid to correct the color. For a better understanding of the fluid mixing system and a detailed treatment of the system per se, as opposed to the monitoring device, reference is had to my copending application Serial Number 610,159, filed September 17, 1956, now allowed.

Referring to Figs. 2 and 3, a system of the present invention adapted from a color comparator system of a general type known in general in the prior art is illustrated. The color comparison system as manufactured and before modification in accordance with the present invention is intended to quantitatively analyze primary color components present in static test sample of a light transmissive medium. As such, color comparison systems of this type serve simply as static color comparison systems. For example, such systems employing a pair of beams split from one have been used by dye and paint manufacturers to analyze a dye or paint which is put in a standard cell or holder through which passes one of the two beams and in terms of constituent dyes in wedge or other varying cross sectioned holders through which the other beam passes and which are adjusted until the light passing through all of them is essentially the same as the light passing through the dye in the sample cell. The relative thicknesses of the test samples is then measured to determine the ratio of constituent dyes so that the constituent dye colors can be mixed to duplicate the color of the dye in the standard cell.

The present invention is not for the purpose of static analysis but for the purpose of monitoring; that is, the present invention has for its primary purpose the constant production of information necessary to the maintenance of the color of a standard fixed for a particular color. Thus, in effect, instead of analysis, the purpose of the present invention is to furnish information to enable proper synthesis, or, more accurately, to indicate deficiencies of constituent colors which must be added to bring the sample back to the standard color. Since the sample in this case is a continuously varying sample, its constituents can each vary different amounts from the standard or desired color at different times, and the monitoring system will supply information for correcting the constituents for each variation in the sample at the time of variation. It will be appreciated that the sample is being continuously drawn from the dye bath, and hence is representative of the needs of the bath.

A useful application of the comparator system is in the color testing of dye solution by comparison of light transmission through a sample of the dye solution with light transmission through a standard using several selected frequency bands of light. These light frequency bands, for example, may correspond respectively to the respective frequency bands of maximum absorbance of particular red dye, yellow dye and blue dye, all of which have maximum absorbance (i.e., minimum transmission) points in different places in the spectrum. A rotating filter wheel is employed, which has a monochromatic filter for each dye to transmit only the wave lengths corresponding to that dye (or color). The colored light is then filtered to relative levels proportional to those desired and finally the beam is split and one of the two resulting beams is passed through the dye solution to be monitored which is being circulated through a test cell.

It should be noted that while ideally it is desirable to employ a system as described using monochromatic filters having maximum transmission at the point of dye minimum light transmission, as a practical matter the constituent filters need not correspond exactly to the dyes of other constituent colors.

In the system of Figs. 2 and 3, light from a source 10 is converged into a parallel beam by condensing lens 11, and passes through a heat absorbing element 12. The light beam then passes through a color filter wheel or disk 13 which is driven at constant speed and which, in the case of a tri-color system, has three monochromatic filters arranged to be brought successively and sequentially into the path of the light beam. In the system presently employed, the color filter wheel is driven at a speed of 5 r.p.m., but it may be driven at any suitable speed. Disregarding for the present the mechanism 14 provided by the present invention, the light beam passes through a Wollaston prism 15 which splits the beam into two divergent light beams A and B, and which also plane polarizes the beams so that beam A is polarized in a plane inclined at 90° to the plane of polarization of beam B. Element 16 is a rotating polarity-responsive filter whose plane of polarization rotates. When its plane of polarization is parallel to the plane of polarization of either beam A or beam B, it passes a maximum amount of the light of that beam; and when its plane of polarization is at right angles to the plane of polarization of either beam A or beam B, it does not pass any of the light from that beam. At other angles, the light passed is proportional to the sine of the angle. Due to the rotation of the polarity-responsive filter 16, the intensity of the light in each beam reaches a maximum and a minimum twice during each revolution, and since the two light beams are plane polarized 90° apart, there is a 90° time or phase relation between the beams. Thus the intensity of the two beams may be represented as sine waves with a 90° time or phase displacement between them.

Element 16 may be a Nicol prism, but in the system now being employed it is composed of two glass plates with a plastic or gelatin based polarizing filter element sandwiched between them. In the system now being employed, element 16 is mounted in a large diameter ball bearing and is driven through a toothed belt by a synchronous motor to insure synchronous speed. However, it could be mounted directly in a hollow shaft synchronous motor.

The divergent beams are converted to parallel beams by segmented cylindrical lenses 17 and 18. Beam A then passes through a cell 19, a sample holder through which the dye solution being monitored is circulated. The dye solution comes from a bath 19c represented schematically only in Fig. 3 by a block shown in dotted lines to which the sample cell is coupled by hose connection 19a through pump 19d or other appropriate means to produce continuous flow from the bath to the sample holder. Connection 19b permits the fluid to flow out either back to the bath or elsewhere. Cell 19 is mounted in a block 20 which has an aperture 21 through which the beam B may freely pass. In prior systems employing a color standard, the second beam B was passed through a standard cell containing dye solution of the desired color. As previously stated, this has been objectionable for a number of reasons, and the principal purpose of the present invention is to overcome the objections and disadvantages incident thereto. In accordance with the present invention, the light transmission in beam B is standardized, by means of mechanism 14 presently to be described, so as to simulate transmission through a color standard, without incurring the disadvantages of a color standard.

As shown in Figs. 2 and 3, the two light beams A and B are redirected convergently downward by tilted prisms 22 and 23 through tube 24 onto a ground glass disk 24a at the bottom of said tube. If the light transmissions in the two beams A and B are equal, the illumination on the disk is substantially constant, because the light intensity of one beam decreases as that of the other beam increases, and vice versa. However, unequal transmission in the two beams A and B causes light pulses which produce an output from phototube 25 which, in turn, activates detection circuits 26. The latter may simply give an indication of the unbalanced condition and/or may control a valve to add dye stuff to the solution under test so as to increase its concentration, as in the system of Fig. 1.

In the system presently employed, element 16 is conveniently driven at a speed of 1800 r.p.m. a speed easily available from the 60 cycle per second frequency of the supply line from which the electrical circuits are operated. Thus the pulsating output of the phototube 25, when such output occurs, is synchronized with the supply current. This is useful in operation of the detection circuits. For example, the output of phototube 25 could be applied to a cathode ray tube whose sweep is controlled from the supply line. However, the present invention is not concerned with the electrical system.

In accordance with this invention, the standardization in beam B is effected by pre-polarizing the light by means of an element in the mechanism 14, so as to decrease the light transmission in beam B to equal the light transmission through a color standard. In the case of a tri-color system this is done for each of the three primary colors employed, so that the light transmission in beam B is standardized for each color. This pre-polarization of the light is accomplished by means of a rotatably adjustable light polarizing element. Suppose, for example, that this element were adjusted so as to polarize the light in a plane at 45° to the right of vertical. Full transmission would then be obtained in beam A, and there would be no transmission in beam B. On the other hand, if this polarizing element were adjusted to polarize the light in a plane at 45° to the left of vertical, full transmission would be obtained in beam B, and there would be no transmission in beam A. By adjustment of the element between these extreme positions, transmission is obtained in both of the beams, and by properly adjusting the element for each color, the transmission in beam B, the brighter of the two, can be decreased to equal the transmission in beam A after passing through a color standard.

Figure 5:
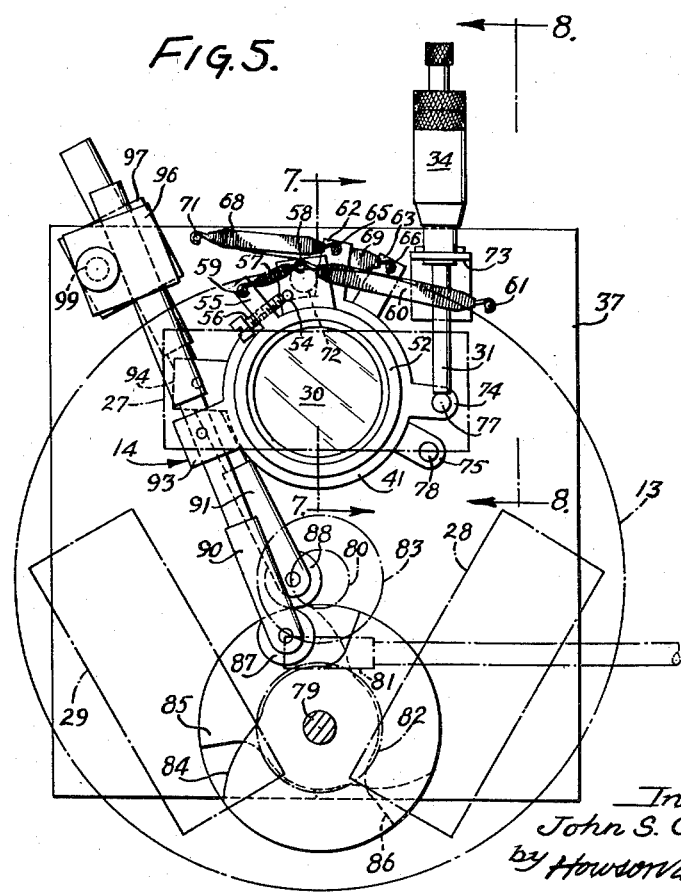
Fig. 5 is a face view of this mechanism.

Referring now particularly to Figs. 4 to 8 which show the mechanism 14 of Figs. 2 and 3, as may be seen in Fig. 5, the color filter wheel or disk 13 has three color filter sections 27, 28 and 29 which are brought sequentially into the path of the light beam from source 10. A light polarizing element 30 is disposed in the path of the light beam, and as mentioned above, this element is rotatably positioned, for each of the colors employed, so as to effect standardized transmission of light in beam B. The three different positions of the light polarizing element 30 are established by three adjustable stops 31, 32 and 33 (see Fig. 8) which, when adjusted, remain stationary. These stops are in the form of longitudinally adjustable stems of micrometer adjustment devices 34, 35 and 36.

The entire mechanism for effecting rotative adjustment of the polarizing element 30 is supported by a stationary supporting plate 37. As may be seen in Fig. 7, this plate has an aperture 38 for free passage of the light beam from source 10, and mounted in the aperture and extending forwardly from the supporting plate 37 is a tubular supporting member 39. Mounted on the member 39 is a fixed bearing sleeve 40 which serves to rotatably support rings 41, 42 and 43 that are held in place by flange 44 at the forward end of sleeve 40 and are maintained in spaced relation by rings 45, 46 and 47. Also rotatably supported by the sleeve 40 is a front ring 48 having a tubular extension 49 which extends into a recess 50 of sleeve 40 and is rotatable about a bearing sleeve 51 also disposed in said recess. The light polarizing element 30 is fixedly mounted in a supporting ring 52 which is rotatably supported by ring 48. As may be seen in Fig. 5, ring 48 has an extension 53 which carries a pin 54. Ring 52 has an extension 55 which carries an adjustment screw 56 engageable with pin 54, the purpose of which will be explained later. A spring 57 has its ends secured to pins 58 and 59 on the said extensions, and this spring serves always to maintain ring 52 in fixed relation to ring 48. Thus, the light polarizing element 30 is always maintained in fixed relation to ring 48 and rotates therewith whenever ring 48 moves. A spring 60 has one end secured to pin 58 and has its other end secured to a fixed pin 61 extending from the supporting plate 37. This spring urges ring 48 clockwise, as viewed in Fig. 5.

Rings 41, 42 and 43 (Fig. 4) have extensions 62, 63 and 64, respectively which carry pins 65, 66 and 67. Springs 68, 69 and 70 are secured between the respective pins 65 and 67 and a fixed pin 71 extending from the stationary supporting plate 37. These springs urge the rings 41 to 43 counterclockwise, as viewed in Fig. 5. A stop pin 72 (see Fig. 4) is carried by and extends from the extension 53 of ring 48, and this pin is engageable by the extensions 62 to 64 of rings 41 to 43. As hereinafter described, only one of the rings 41 to 43 is permitted to be effective at one time and its position is determined by the associated one of the stops 31 to 33. With the position of the effective ring established, spring 60 causes the stop pin 72 to engage the associated stop extension of the effective ring so as to establish the desired position of the light polarizing element 30.

Figure 8:
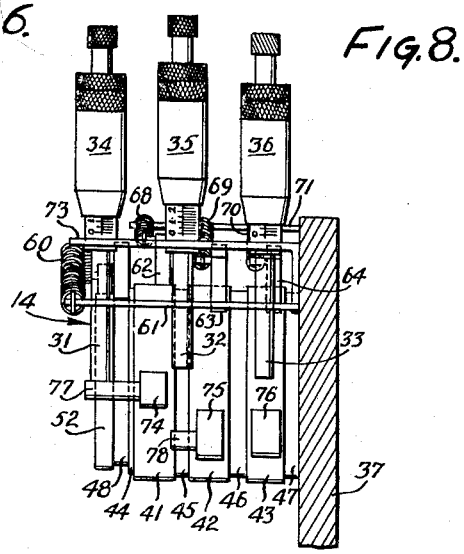
Fig. 8 is a sectional view taken along line 8—8 of Fig. 5.
Figure 7:
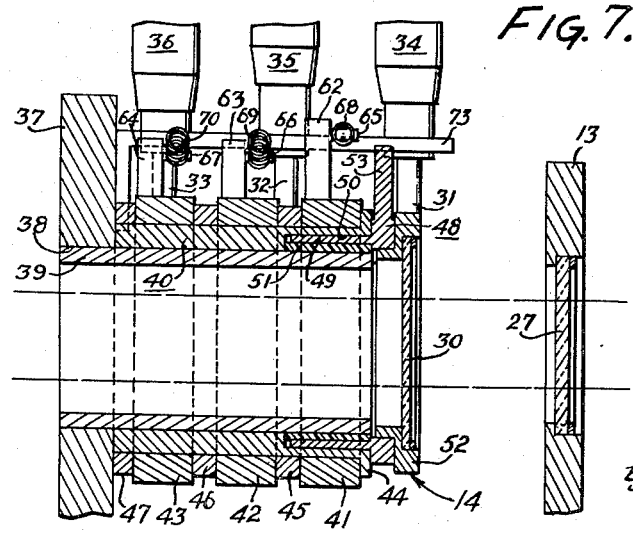
Fig. 7 is a sectional view taken along line 7—7 of Fig. 5.

As may be seen in Fig. 8, the micrometer adjustment devices 34 to 36 are mounted on a bracket 73 secured to the supporting plate, and the rings 41 to 43 are provided with extensions 74 to 76 through which the positions of the rings are established by the stops 31 to 33. Extensions 74 and 75 have lateral fingers 77 and 78 for engagement with the stops 31 and 32, while extension 76 is engageable directly with stop 33. The only reason for the fingers 77 and 78 is to permit close spacing of the rings 41 to 43.

Figure 6:
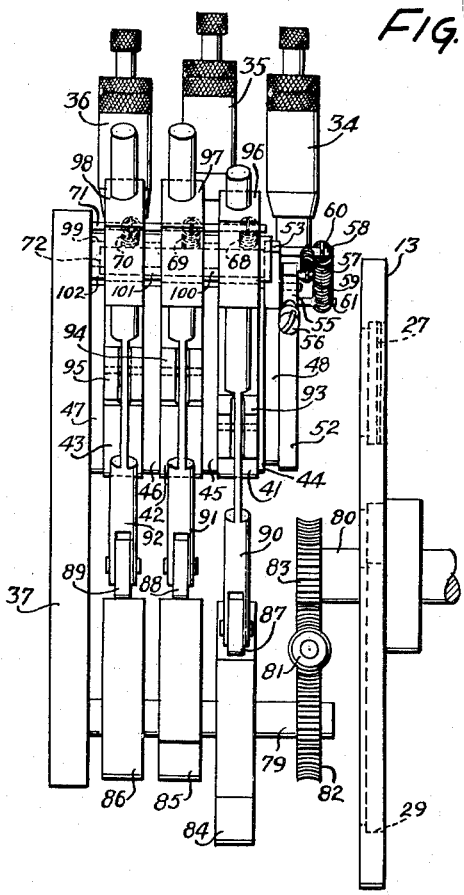
Fig. 6 is a side elevational view of the same.

As may be seen in Figs. 5 and 6, a shaft 79 is rotatably supported by the supporting plate 37. This shaft is driven synchronously with the shaft 80 of the color filter wheel 13 through a motor driven worm 81 which meshes with worm gears 82 and 83 mounted respectively on the two shafts. Three similar cams 84, 85 and 86 are mounted on shaft 79 and are disposed in 120° angular relation to one another. These cams are engageable with rollers 87, 88 and 89 carried at the ends of rods 90, 91 and 92. The latter have flat central sections which are pin connected to bifurcated extensions 93, 94 and 95 on rings 41 to 43. The upper portions of the rods 90 to 92 are slidably supported by bearing elements 96 to 98 which are rotatably mounted on a fixed stud 99 and are held in spaced relation by spacer rings or collars 100 to 102.

The cams 84 to 86 are shaped so that at any particular time one of the rollers 87 to 89 is out of engagement with its associated cam while the other two rollers are engaged by their associated cams. The two engaged rollers are held by their cams in raised position to render two of the rings 41 to 43 ineffective. Thus, in the condition shown in the drawings, rings 42 and 43 have been moved clockwise, as viewed in Fig. 5, and their extensions 75 and 76 are out of engagement with the associated stops 32 and 33, as may be seen in Fig. 8. Roller 87 is out of engagement with its associated cam 84, and therefore ring 41 is effective and its spring 68 is permitted to move this ring counter-clockwise so that its extension 77 is in engagement with the stop 31. The position of the light polarizing element 30, at this time, is therefore established by the stop 31 through the medium of ring 41, rod 72 and ring 48.

From the foregoing description, it will be seen that rings 41 to 43 are rendered effective successively by the cams 84 to 86, and effective ring is urged by its spring to a position determined by the associated one of the fixed stops 31 to 33. At the same time, ring 48 is moved by spring 60 to a position determined by the engagement of stop pin 72 with the extension on the effective one of the rings 41 to 43. The light polarizing element 30 follows the movement of ring 48 by reason of the action of spring 57. Thus the rotationally adjustable light polarizing element 30 is moved successively to three positions determined by the fixed stops 31 to 33. In operation, as the cam shaft 79 is driven synchronously with the shaft 80 of the collar filter wheel 13, each time one of the color filter sections 27 to 29 moves into the path of the light beam from source 10, the light polarizing element 30 is positioned for the particular color by one of the stops 31 to 33 corresponding to that color. These stops are present to establish different positions of the light polarizing element 30 for the three colors, and each position of the light polarizing element establishes a predetermined light transmission in beam B equal to the transmission intensity in beam A after partial absorption of light by the desired color concentration in the test cell 19.

The light transmission in beam A through the test cell 19 is compared with the transmission in beam B for each of the colors employed. The light comparison function remains unchanged, and is performed in the manner previously described.

The purpose of the adjusting screw 56 may now be understood. In adjusting the instrument prior to use the three micrometer adjustment devices 34–36 are set to zero extension, so that all three extensions 62 to 64 of rings 41 to 43 contact stop pin 72. With one of the color filters 27 to 29 in position, screw 56 is adjusted until a constant output from photo-tube 25 is obtained. This is preferably done with the sample cell in place as this automatically compensates for the absorbtance and reflectance of the cell and water. This procedure effectively standardizes the instrument zero reading for all of the colors employed in filter wheel 13.

From the foregoing description, it will be seen that the present invention provides a novel method and a novel operative combination for establishing a standard for each of the colors employed, and eliminates the necessity of employing a color standard of colored material with its incident objections and disadvantages.

In operation using the standard of Figs. 4–8 in the system of Fig. 1, beams of light A and B as seen in Figs. 2 and 3 are adjusted in relative intensities by the standard 14. In practice, the beams are first adjusted to a zero set position as described above in order to compensate for the absorbtance and reflectance from cell 19. If the intensities of the two beams remain the same after passing through the sample and the standard, the sensing element 25 will not produce an error signal. If, however, the intensity of the two beams differ, an error signal will be produced and will produce a control signal in the detection and signal producing means 9 to actuate one or more of the solenoids 2a, 2b and/or 2c.

Synchronizing means, which may be mechanical or electrical, synchronizes the control signals with the filter wheel position at its various colors so that the proper valve or combination of valves is operated at the proper time. The valves may be adapted to permit correction in one of several ways. Perhaps the most satisfactory is for the valves to open a fixed amount to permit a unit quantity of fluid through upon indication of any deviation. Then the error will continue to demand such units until the bath is corrected at least in the frequency band represented. Alternatively, the error signal may be quantitative and actuate the valve to add the constituents in proportion to the need.

Although the standard of the present invention is concerned primarily with the monitoring of the color of fluid baths it will be apparent to those skilled in the art that the standard lends itself also to testing static color samples. On the other hand, in other systems where possibly a monochromatic or limited frequency band of light is involved, a rotative light polarizing element would not have to be employed as the standard since a fixed element would serve as well.

While a preferred embodiment of the invention has been illustrated and described, the invention is not limited thereto but contemplates such modifications and other embodiments as may occur to those skilled in the art.

While the system specifically shown and described is useful primarily for visible light, it will be understood that modified apparatus in accordance with the present invention may be capable of use with radiation whose frequencies range above and/or below the visible spectrum.

While a filter wheel has been described as a means of producing a plurality of frequency bands, it will be appreciated by those skilled in the art that other means for obtaining a plurality of frequency bands, such as a prism monochromator, may be substituted. It will be obvious that the synchronizing system as applied to the filter might well be modified in such event.

This application constitutes a continuation-in-part application of the application of John S. Christie, Serial No. 493,127, filed March 9, 1955, for Method and System of Color Monitoring, now U.S. Patent No. 2,928,310.

I claim:

1. The method of monotoring the color of a fluid bath comprising placing in a light beam a standard to stimulate the desired fluid color, withdrawing a sample of predetermined size from the bath, constantly replacing the fluid sample from the bath, passing a light beam through the standard interposing means for sequentially limiting the frequency of the light in the beam to predetermined frequency bands in a particular sequence, interposing means for splitting the beam into two beams having different intensities, passing one of the beams through the sample, and continuously comparing the intensities of the two beams after the one has passed through the sample to detect any deviation from the predetermined relative light intensities of the beams which obtains when the sample matches the color represented by the standard.

2. The method of monitoring the color of a fluid bath comprising placing in a light beam a standard to simulate the desired color, withdrawing a sample of predetermined size from the bath, constantly replacing the fluid sample from the bath, passing a light beam through the standard interposing means for sequentially limiting the frequency of the light in the beam to predetermined frequency bands in a particular sequence, splitting the beam into two beams having intensities differing by the amount of the filtering effect of the standard, passing the brighter beam through the sample, and continuously comparing the intensities of the two beams after the brighter beam has passed through the sample to detect any difference in the light intensities of the two beams.

3. The method of claim 2 in which the intensities of the two light beams are made to vary as sine waves 90° out of phase with one another and directed to a common comparison means whereby difference in the intensity at the comparison means appears as a flickering of intensity which indicates a difference in color between the standard and the sample for the particular filter frequency band.

4. The method of claim 3 in which the two light beams are derived from the single beam by means including polarizing means which produce both a sine function variation in their intensities and limits the maximum intensity of at least the darker of the two beams.

5. The method of correcting color of a monitored fluid comprising placing in a light beam a standard to simulate the desired fluid color, withdrawing a sample of predetermined size from the fluid bath to be monitored, constantly changing the fluid sample, passing a light beam through the standard, interposing means for splitting the light beam into two differently polarized beams, interposing in the light beams after they have been split and rotating a light polarizing means for causing the two beams to vary sinusoidally in amplitude and have controlled maximum amplitudes 90° apart, passing the beam having the larger amplitude through the sample, interposing means for sequentially varying the frequency band of light in the two beams, adjusting the beams for each frequency band until they are of equal intensity beyond the sample when the sample is exactly of the color simulated by the standard, simultaneously comparing the light beams after passing through the sample to detect deviation of intensity of one beam from the other, and upon detection of deviation in any frequency band adding to the bath color constituents which produce the color monitored at the frequency band to restore the color of the standard to the fluid bath and its samples.

6. The method of claim 5 in which the frequency bands sequentially selected correspond to the maximum absorbance of the component fluid colors in the sample.

7. The method of claim 5 in which colors are added in proportion to the deficiency detected.

8. The method of claim 5 in which the colors are added in equal quantities of predetermined size at each determination of deviation until the sample shows correction.

References Cited in the file of this patent

UNITED STATES PATENTS

| | | |
|---|---|---|
| 1,792,752 | Michelssen | Feb. 17, 1931 |
| 2,186,203 | Centeno | Jan. 9, 1940 |
| 2,209,764 | Cassen et al. | July 30, 1940 |
| 2,328,461 | Kienle et al. | Aug. 31, 1943 |
| 2,682,801 | Davidson et al. | July 6, 1954 |

FOREIGN PATENTS

| | | |
|---|---|---|
| 812,967 | Germany | Sept. 6, 1951 |

UNITED STATES PATENT OFFICE
CERTIFICATE OF CORRECTION

Patent No. 2,978,951 April 11, 1961

John S. Christie

It is hereby certified that error appears in the above numbered patent requiring correction and that the said Letters Patent should read as corrected below.

Column 7, line 23, for "present" read -- preset --.

Signed and sealed this 10th day of October 1961.

(SEAL)
Attest:

ERNEST W. SWIDER
Attesting Officer

DAVID L. LADD
Commissioner of Patents
USCOMM-DC